United States Patent [19]

Huege et al.

[11] Patent Number: 4,578,118
[45] Date of Patent: Mar. 25, 1986

[54] KAOLIN CLAY-BASED PIGMENT

[75] Inventors: Fred R. Huege, Belle Mead; Richard A. Slepetys, Bricktown, both of N.J.; David L. Catone, Hopkinton, Mass.

[73] Assignee: Engelhard Corporation, Menlo Park, N.J.

[21] Appl. No.: 701,110

[22] Filed: Feb. 13, 1985

[51] Int. Cl.[4] ............................ C09C 1/22; C09C 1/40
[52] U.S. Cl. ............................. 106/288 B; 106/286.5; 106/304; 106/309
[58] Field of Search ................. 106/286.5, 288 B, 304, 106/309, DIG. 4

[56] References Cited

U.S. PATENT DOCUMENTS

| | | | |
|---|---|---|---|
| 3,616,900 | 11/1971 | Cecil et al. | 106/288 B |
| 3,754,712 | 8/1973 | Cecil | 106/288 B |
| 4,186,027 | 1/1980 | Bell et al. | 106/288 B |
| 4,246,039 | 1/1981 | Mixon, Jr. | 106/288 B |
| 4,299,807 | 11/1981 | Angel et al. | 106/288 B |
| 4,381,948 | 5/1983 | McConnell et al. | 106/288 B |
| 4,427,450 | 1/1984 | Kostauser | 106/288 B |
| 4,498,931 | 2/1985 | Kadokura | 106/309 |

Primary Examiner—Paul Lieberman
Assistant Examiner—Willie J. Thompson
Attorney, Agent, or Firm—Inez L. Moselle

[57] ABSTRACT

A substantially white, anhydrous, amorphous aluminosilicate pigment is obtained by calcining a combination of previously uncalcined kaolin clay and an alumina source. The calcination is carried out at a temperature of about 870° C. to 1400° C., preferably about 870° C. to 1260° C., for a suitable period of time, e.g., 0.1 to 3 hours. The pigments obtained by the foregoing method display enhanced brightness greater than the merely additive brightness which would be obtained by mixing alumina with a previously calcined kaolin clay and are otherwise well suited for use as paper-filling or coating pigments.

26 Claims, 1 Drawing Figure

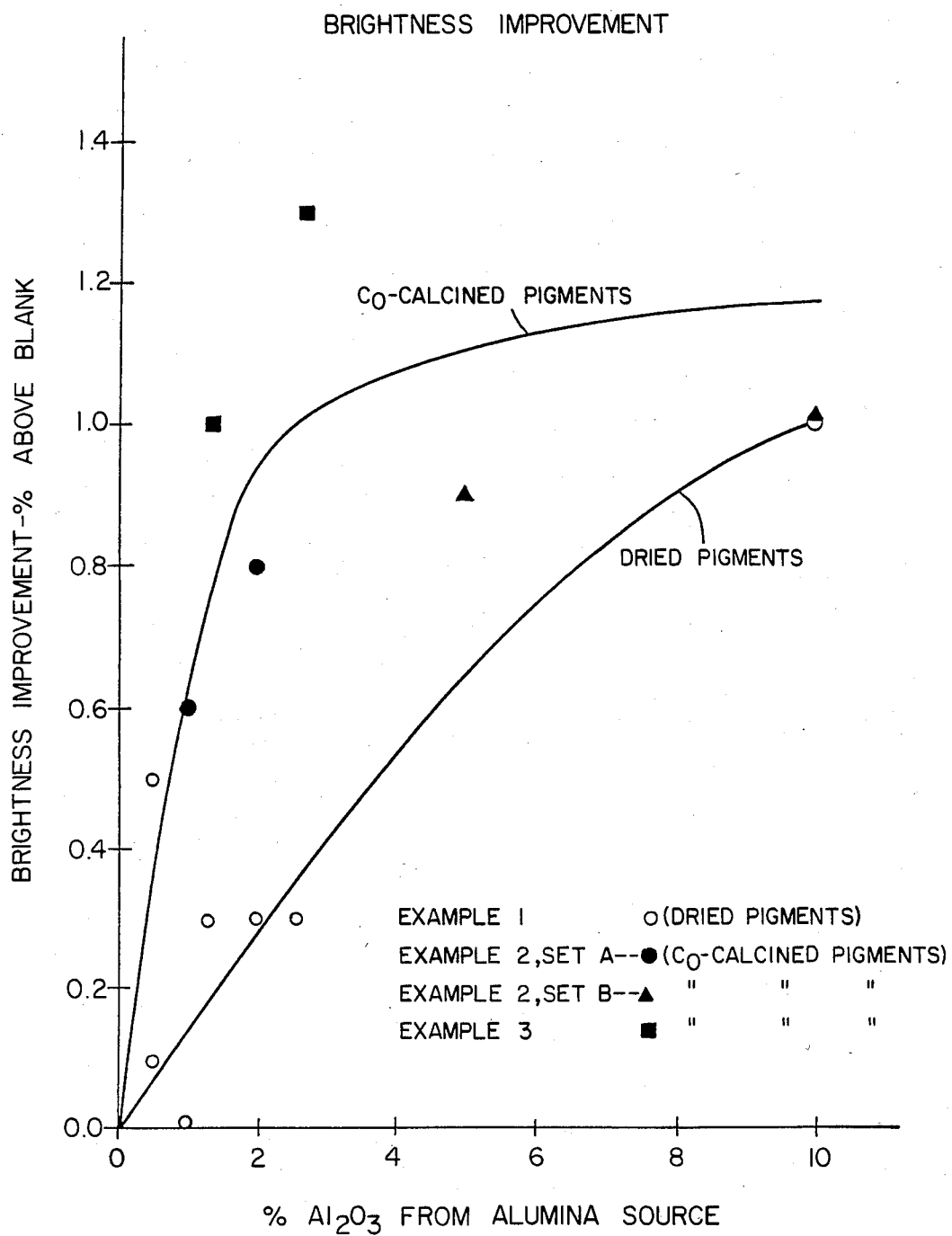

KAOLIN CLAY-BASED PIGMENT

BACKGROUND OF THE INVENTION

1. Field of the Invention

The present invention pertains to a kaolin clay-based pigment and more particularly to a kaolin clay pigment which contains an added inorganic aluminum oxide compound and which finds utility as a coating material or filler for paper of various kinds.

Still more particularly, the invention pertains to pigments of enhanced brightness made from kaolin clays containing iron compounds, for example, iron oxides and/or iron oxides in conjunction with titanium oxides. One such class of kaolin clays containing iron compounds is "hard kaolin clay". This term, as used in this specification and in the claims, means kaolin clays such as the sedimentary clays mined in the middle and east Georgia kaolin districts. These clays are distinguished from the more commonly known and used soft kaolin clays in a number of ways as summarized, for example, in table form at page 29 of "Field Conference, Kaolin, Bauxite, Fuller's Earth, Annual Meeting of the Clay Minerals Society, 1979", the disclosure of which is incorporated by reference herein. Soft kaolin clays usually have a white or sometimes orange tint and display the characteristics of fracturing smoothly and breaking easily into friable angular fragments when dried, the fragments displaying smooth, flat or sub-conchoidal surfaces. In contrast, most but not all hard kaolin clays have a gray tinge or coloration and are further characterized by breaking into irregularly shaped fragments having rough surfaces. The hard kaolin clays usually have a higher dry strength than do soft kaolin clays at the same moisture content, which accounts for the nomenclature "hard" kaolin. Further, hard kaolin clays as a class are finer than the soft kaolin clays. For example, whereas about 50% by weight of the particles of a typical hard kaolin crude clay are finer than 0.4 micron, about 50% by weight of the particles of a typical soft kaolin crude clay are finer than 1.5 microns, as determined by conventional sedimentation procedures. Hard kaolin clays also commonly contain a significant iron content, typically about 1% by weight $Fe_2O_3$ whereas soft kaolin clays ordinarily contain an appreciably lesser quantity of iron compounds, for example, about 0.3% by weight $Fe_2O_3$. Many differences between hard kaolins and soft kaolins are thought to be traceable to differences in their origin. Soft kaolins are believed to have been formed by in situ weathering of kaolinite crystals. Hard kaolin deposits, on the other hand, are believed to have been formed by the sedimentation from marine water of transported kaolinite crystals, this sedimentation taking place under anoxic conditions.

Hard and soft kaolin clays are distinguished from each other in the text Grim's "Applied Clay Mineralogy", 1962, McGraw-Hill Book Company, Inc., at pages 394 to 398 thereof, the disclosure of which is incorporated by reference herein. As mentioned in the Grim publication, hard kaolins are generally darker than soft kaolins. The Grim text also points out that the ultimate size of particles, i.e., the size of the particles in a well-dispersed clay pulp, of hard kaolin clays is significantly finer than those of soft kaolin clays. As described by the Grim text, a representative sample of hard kaolin clay had about 90% by weight of the ultimate size particles finer than 2 microns and about 60% by weight finer than $\frac{1}{2}$ micron, the average particle size of typical hard clays being below $\frac{1}{2}$ micron. Soft kaolin crude clays, in contrast, contain a substantial amount of particles coarser than 2 microns, with the average particle size of a representative papermaking soft kaolin clay being about 1 micron, with only a minor amount finer than $\frac{1}{2}$ micron. Such particles generally differ from the finer particles in that the former are composed of a substantial proportion of stacks or booklets of hexagonal clay crystals. Still other stated differences in the Grim text between hard and soft clays are that hard kaolin clays tend to be less ordered (well crystallized) than soft kaolin clays and therefore produce less sharply defined X-ray diffraction peaks, and the hard kaolin clays absorb less water than do soft kaolin clays. Kaolinite is a major constituent of kaolin clays.

For many commercial uses, such as for use as a coating or filler on paper stock, the brightness of the pigment is significant. The brightness values of such materials are conventionally measured by a GE block brightness test and all brightness values of pigments and other materials referred to herein are as determined by TAPPI (The American Paper and Pulp Institute) procedure T64605-75. The material to be tested for brightness is pressed into a ring-shaped sample holder and its brightness is measured by using a GE reflectance meter and light having a wavelength of 457 nanometers.

The abrasiveness of the material used as a coating or filler on paper stock is also important as more abrasive materials increase the rate of wire wear on the papermaking machine. The weight loss of a wire screen caused by the abrasive action of a given coating or filler material may be employed as a test to indicate a relative measure of the abrasive characteristic of the material. One such well known test, referred to as the Valley abrasion test, is similar to Procedure 65, Institute of Paper Chemistry, April, 1962 (TAPPI 32 (II) 516–519) and was used to measure abrasiveness as referred to herein below.

DESCRIPTION OF THE PRIOR ART

U.K. Patent Specification No. 1 228 538 discloses coated kaolinite comprising a kaolinite having a surface coating of an inorganic gel such as magnesium silicate, aluminum silicate, silica or alumina, the inorganic gel preferably comprising from $2\frac{1}{2}$ to 15% by weight of the kaolinite. Among other qualities, the material is stated to have a better whiteness and brightness than kaolinite treated by previously known methods. Example 4 of the patent discloses slurrying a fine particulate kaolinite in water, adding aluminum sulfate to the slurry and, after mixing, adding ammonium hydroxide to bring the pH up to 7.5 to form an aluminum hydroxide gel coating on the kaolinite particles. The gel coated clay particles were washed and then dried at 90° C.

U.S. Pat. No. 3,403,041 discloses, with reference to column 21 of U.S. Pat. No. 3,171,718, that it is well known that the brightness of kaolins can in general be improved by calcining, usually at a temperature of about 1,000° C., e.g., 980° C. to 1038° C.

The 3,403,041 patent discloses that adequate brightness can be attained for freshly delaminated kaolin particles by heating the material to a temperature of only about 800° C., thereby attaining a desired level of brightness without rendering the material unduly abrasive. This patent also discloses at column 4 that a paint pigment of desired low sheen, good brightness and hiding power can be attained by combining from 3 to 20% by weight of aluminum trihydrate with the delaminated kaolin prior to heating to a temperature of about 800° C. The resultant product is an aluminosilicate pigment stated to be of superior whiteness, brightness and hiding power. This patent discloses that the heating forms mullite needles of high abrasiveness and that by limiting the heating to 800° C. the size and extent of the mullite formation are controlled so as to limit abrasiveness of the resultant product.

U.S. Pat. No. 3,353,668, the disclosure of which is incorporated by reference herein, discloses methods for improving the brightness of hard kaolin clays by a sequence including oxidation bleaching (e.g., with potassium permanganate) prior to flotation and reducing bleaching (e.g., with hydrosulfite or hydrosulfurous agents.)

U.S. Pat. No. 3,586,523 discloses the calcination of hard kaolin clays to increase the brightness thereof to provide a pigment suitable for use as a filler for paper. The patent indicates that the clay particles should be heated at a temperature of about 1600° F. to 2300° F. (about 871° C. to 1260° C.) during calcination for a time sufficient to substantially completely dehydrate the clay without forming high temperature crystalline phases.

The calcination of delaminated soft kaolin clays is known in the art. For example, U.S. Pat. No. 3,171,718 discloses the delamination of soft kaolin clay to produce a white, bright clay product, including calcination of the mechanically delaminated clay. Similarly, U.S. Pat. No. 3,519,453 discloses a bright clay product substantially free of undelaminated aggregates and predominating (on a weight basis) in platelets of more than two microns in size. The pigment is stated to be particularly useful as a paper filler or top coating pigment and is made by mechanically delaminating soft kaolin clay and heating or calcining the product in a specified manner.

The calcination of fine particle size kaolins is shown by U.S. Pat. No. 3,014,836, which discloses a bright, white, calcined fine kaolin powder at least 80% or more by weight of the powder having a maximum particle size of about 2 microns as determined by the sedimentation method.

SUMMARY OF THE INVENTION

In accordance with the present invention there is provided a method of making a white, calcined kaolin clay-based pigment which method comprises combining an uncalcined, iron compound-containing kaolin clay, e.g., a kaolin clay comprising a hard kaolin clay, in fine particulate form with a minor proportion of an alumina source and calcining the resultant clay-alumina source combination at a temperature of about 870° C. to 1400° C., preferably about 870° C. to 1260° C., more preferably about 950° C. to 1050° C., for a time sufficient to calcine the clay, preferably for a period of about 0.1 to 3 hours, say 0.3 to 2 hours.

In one aspect of the invention the kaolin clay and the alumina source are provided in respective quantities so that the resulting pigment comprises about 0.1 to 15%, preferably about 0.5 to 10%, by weight as $Al_2O_3$ of an inorganic oxide compound of aluminum derived from the alumina source.

Another aspect of the invention provides for combining the kaolin clay and alumina source by admixing them in an aqueous vehicle and separating the resultant clay-alumina source combination from the aqueous vehicle.

In one aspect, the invention includes calcining the clay-alumina source combination at a temperature and for a time sufficient to fully calcine the clay.

Yet another aspect of the invention includes combining the kaolin clay and an alumina source comprising a water soluble aluminum compound in an aqueous vehicle to form a slurry of clay particles in an aqueous solution of the compound, precipitating the aluminum compound onto the clay particles, separating the thus-coated clay particles from the aqueous phase and calcining the coated particles.

In accordance with the present invention there is also provided a white, calcined, kaolin clay-based pigment made by the methods as described above. The resultant pigment comprises an anhydrous, amorphous aluminosilicate material obtained by calcining in fine particulate form a previously uncalcined kaolin clay and an alumina source. As used herein and in the claims, an "alumina source" is any suitable aluminum compound or aluminum containing material which, under the conditions employed to make the pigment of the invention, i.e., calcination under the specified conditions, comprises or is converted to an inorganic oxide compound of aluminum, e.g., alumina and/or other compounds, in the pigment product.

In one aspect of the invention, the pigment of the invention has a particle size range such that at least 90% by weight of the pigment comprises particles finer than about 10, preferably finer than about 5, microns, at least about 80% by weight of the pigment comprises particles finer than about 6, preferably finer than about 3, microns and at least about 50% by weight of the pigment comprises particles finer than about 3, preferably finer than about 1.5, microns.

Other aspects of the invention provide one or more of the following features: the kaolin clay may comprise a hard kaolin clay or a mixture of hard and soft kaolin clays, e.g., a mixture of approximately equal weights of hard and mechanically delaminated soft kaolin clays, and the pigment may have a brightness of at least about 93, preferably a brightness of at least about 95. All reference herein and in the claims to "brightness" of the pigments or other materials refers to GE brightness as measured at 457 nanometer wavelength using TAPPI (The Association of the Pulp and Paper Industry) method T64605-75.

BRIEF DESCRIPTION OF THE DRAWINGS

The drawing shows a graph on which the brightness improvement attained by, respectively, pigments of the invention and prior art alumina-containing pigments, is plotted on the vertical axis and alumina content is plotted on the horizontal axis.

DETAILED DESCRIPTION OF THE PREFERRED EMBODIMENTS

In order to attain the benefits of the invention the uncalcined iron compound-containing kaolin clay should be calcined only after combination with the added alumina source, and should not be pre-calcined prior to admixture with the added alumina source as it is believed that the enhanced brightness benefits of the invention are attained when the crystalline and other changes accompanying calcination take place in the presence of added alumina source.

The soft kaolin clays employed in the invention should be mechanically delaminated whereas other kaolin clays may be, but need not necessarily be, mechanically delaminated. In any case, the clays may optionally be beneficiated to enhance the brightness. The clay may be beneficiated to enhance brightness by various steps known in the art of kaolin processing, such as reduction and oxidation bleaches, magnetic separation, ultraflotation treatment, etc. Ultraflotation treatment is described in U.S. Pat. No. 2,990,947 and features the addition of a "carrier" material such as ground limestone to enhance the flotation and removal of colored impurities from dispersed clay pulps by means of flotation reagents. The clay will usually also be fractionated to attain a desired particle size range. In any case, the kaolin clay employed in preparing the pigments of the invention will normally have been at least degritted and classified to a desired size range by conventional techniques and optionally may be beneficiated to enhance brightness. However, such beneficiation normally does not remove to any significant degree the iron compound content of kaolin clays which is believed to be inimical to enhancing brightness of the clays, e.g., which is believed to be responsible, at least in part, for the characteristic gray color of many hard kaolin clays.

For example, an oxidation beneficiation technique as disclosed in U.S. Pat. No. 3,353,668, the disclosure of which is incorporated by reference herein, is a highly satisfactory process for beneficiating kaolin clays. Such beneficiation may typically include degritting and fractionation of the clay to a desired particle size range, preparation of an aqueous slip of the clay and oxidative bleaching of the slipped clay with an inorganic chemical such as potassium permanganate, flotation of the bleached clay, further oxidative bleaching with, for example, potassium permanganate and reduction bleaching with a hydrosulfite or hydrosulfurous compound. The kaolin clay is then slurried in water with an added alumina source which may be, for example, alumina trihydrate or a soluble aluminum compound such as aluminum sulfate (alum). More specifically, a solution of aluminum sulfate may be prepared and the crude or beneficiated kaolin clay slurried therein to a solids content of, say, 10% or so. The pH of the slurry of hard kaolin clay in the aluminum sulfate solution may then be decreased by the addition of a suitable acid such as sulfuric acid so as to maintain the aluminum sulfate in solution. The pH of the slurry aqueous phase may then be increased by the addition of a suitable alkali such as sodium hydroxide to an approximately neutral pH, say 7.5, to precipitate aluminum, presumably as aluminum hydroxide, onto the clay particles. The solids are then separated from the aqueous phase as by filtration and may be washed, dried and pulverized and then calcined. The calcined product may be further pulverized after calcination to attain a finished particle size range for the finished pigment. Suitable size ranges comprise those in which the finished pigment contains substantially less than 1% by weight, e.g., not more than about 0.01% by weight, of particles retained on a 325 mesh screen.

It has been found that calcination of the combined hard kaolin clay-alumina source results in a significant increase in brightness as compared to otherwise identical pigments in which the hard kaolin clay has been calcined prior to addition of the alumina source. In other words, a beneficial effect on brightness is attained by calcining the hard kaolin clay after combination with the alumina or alumina precursor material. Further, calcined alumina is highly abrasive and no brighter than alumina trihydrate so that calcined alumina would not be added to a paper coating or filler pigment (or to any other product where high abrasiveness would be a problem) as it has the serious disadvantage of abrasiveness and no corresponding advantage. It has surprisingly been found that the practice of the invention not only enhances brightness to a degree greater than mere additive brightness but it does not unduly increase abrasiveness of the product, as might be expected due to the likely formation of alumina or other inorgnic oxide compounds of aluminum during calcination of the combined clay and alumina source.

The calcination is preferably, though not necessarily, carried out at a temperature and for a duration sufficient to provide a substantially fully calcined kaolin clay. A calcination temperature as low as about 870° C. may be employed, for a duration of time, sufficient to calcine the clay but at this relatively low temperature the calcined clay will comprise substantial meta-kaolin and will not be fully calcined clay. However, it is preferred to use a calcination temperature sufficiently high to assure the attainment of a fully calcined kaolin clay which, as will be understood by those skilled in the art, means a calcination temperature of about 950° C. to 1050° C., say about 965 C.° to 985° C. At this temperature an exothermic crystalline phase change takes place, which signifies conversion to a fully calcined clay. As used herein and in the claims, "calcining" means heating the clay sufficiently to convert it from a hydrated aluminum silicate crystalline material to a substantially anhydrous and, in the case of a "fully calcined" clay, amorphous material. Thus, the term "calcined" as used herein and in the claims embraces a partially or incompletely calcined clay which retains a somewhat distorted or modified crystalline structure (sometimes referred to as meta-kaolin) and a fully calcined clay which is amorphous at least in the sense that X-ray diffraction patterns of the fully calcined clay do not contain the well defined X-ray diffraction peaks exhibited by the crystalline uncalcined clay.

The upper temperature limit for the calcination step is mandated by the fact that the amount of mullite formation should be controlled so as to control the hardness or abrasiveness of the product pigment for uses such as paper filler pigment. For example, it is known that calcination of kaolins at temperatures of 1400° C. to 1600° C. converts substantially all the kaolin to mullite, a more abrasive and harder material. Accordingly, the calcination temperature is preferably limited to 1400° C. or less, more preferably to not more than about 1260° C., say to not more than about 1050° C. Therefore, the preferred temperature range for calcination is about 870° C. to 1260° C., more preferably, about 950° C. to 1050° C.

The duration of calcination at the indicated temperature range should be for a time at least sufficient to calcine the clay. This will also suffice to enhance the brightness of the finished calcined pigment. Generally, carrying out the calcination for a time sufficient to heat the pigment particles to the indicated temperature and maintain them at that temperature for a period of from about 0.1 to 3 hours, say 0.3 to 2 hours, is sufficient.

The clay is calcined in fine particulate form (the clay-alumina source combination may be pulverized before calcining) to insure generally uniform heating to the requisite temperature. Therefore, the crude clay is refined at least to the extent that coarse agglomerates, grit and other impurities (plus 325 mesh residue) are removed. As is well known by those skilled in the art, such refining may be accomplished by known wet or dry processing techniques. In wet processing, the clay is dispersed in water and degritted by means of screening or other techniques and is preferably hydraulically classified by sedimentation or centrifugation in order to remove substantially all particles larger than about 2 microns diameter. (All reference to particle size in this specification and claims is to the equivalent spherical sedimentation diameter of the particles as measured by standard aqueous sedimentation techniques.) The wet, degritted clay may undergo further conventional refining steps such as flotation to remove colored impurities from the clays and may be chemically bleached in addition to or in lieu of flotation treatment.

As indicated above, it is known that beneficiation of a crude kaolin clay by a process sequence including oxidation and flotation steps is helpful in enhancing the brightness of pigments made from the clay. Flotation processes involve the utilization of flotation oils, a residual amount of which remains in the clay after the flotation process. It would be expected that for calcined clay products, this flotation oil would be oxidized and driven off during the calcination sequence. However, even though the clay pigment is calcined, residual flotation oils or their residue after calcination have an adverse effect on brightness of the finished product. The oxidative bleaching step which normally is used in the beneficiation process successfully removes the floatation oil and/or overcomes the adverse effect of the flotation oil on the calcined product brightness. Therefore, when a beneficiation process for the clay including a flotation step using flotation oils is utilized, the flotation step is followed by an oxidative bleaching step in order to remove and/or negate the brightness reducing properties of residual flotation oils.

As mentioned above, U.S. Pat. No. 3,586,523 discloses the calcination of hard kaolin clay to increase its brightness. However, such calcination does not effect the iron content of hard kaolin clays which, as also mentioned above, usually amounts to about 1% by weight, measured as $Fe_2O_3$, of the weight of the hard kaolin clay. In carrying out work on the brightness of various pigments including silica and alumina pigments, it was noted that increasing iron contents had an adverse effect on brightness. Alumina is inherently brighter than kaolin clays in general and significantly brighter than most hard kaolin clays so that the addition of alumina or aluminum hydroxides to kaolin clay particles, as by coating the clay particles with alumina or aluminum hydroxide, would be expected to enhance the brightness of the clay simply by the additive effect of the brighter aluminum hydroxide.

On the other hand, the present invention requires that alumina or an alumina source be combined with an uncalcined kaolin clay containing iron compounds and that the clay be initially calcined in the presence of the alumina or alumina source. Without wishing to be bound by any theoretical considerations, it is believed that by calcining the clay or clays only after combining an alumina source with the clay or clays the adverse effect on brightness of the iron content of the kaolin clay is overcome to a greater degree than would be the case by simply mixing alumina with the clay. In other words, the brightness enhancement attained by calcining the combined kaolin clay and alumina source is greater than the simply additive brightness enhancement attained by adding alumina or aluminum hydroxide to previously calcined clay particles. It seems likely that at the calcination temperatures utilized, reactions occur which may involve the iron content of the kaolin clay or clays and the alumina source and result in a reaction product of enhanced brightness.

The alumina source may be combined with the kaolin clay by any suitable technique. For example, the uncalcined clay may be admixed with anhydrous alumina or a hydrated alumina by simple mechanical mixing, and the admixed materials calcined. Alternatively, the kaolin clay particles may be dispersed in a liquid medium such as water and an aluminum compound such as aluminum sulfate (alum) dissolved therein. As mentioned above, by adjustment of the pH of the solution hydrated alumina may be precipitated onto the clay particles. The thus coated particles are then separated from the liquid, dried and calcined. Regardless of the manner in which the clay is combined with the alumina source, preferably a minor proportion of alumina source relative to the amount of clay is employed. As used herein and in the claims a "minor proportion" means an amount of alumina source which will provide in the pigment (as $Al_2O_3$) a weight of alumino inorganic oxide which is less than one-third, preferably less than one-quarter of the weight of clay (dry basis). As mentioned above, the clay should be calcined in fine particulate form and so if the alumina source is deposited on the clay by the wet method described, or if the clay is refined by wet processing methods, it is dried and pulverized to a desired fine particle size, say minus 200 mesh, prior to calcination. The calcination may be carried out by any conventional means such as utilization of a rotary calciner with a shielded flame, or a multi-hearth or muffle furnace.

Another effect of calcination is that the particulate clay material tends to agglomerate into larger size particles. For example, a hard kaolin clay which is calcined (without added alumina source) may exhibit an average particle diameter size of about 0.3 micron before calcination and an average particle size diameter of about 0.8 micron after calcination. The presence of an added alumina source as required by the present invention may have a tendency to inhibit sintering or agglomeration of the hard kaolin clay particle. Therefore, calcination of the combined iron compound-containing kaolin clay and alumina source probably produces after calcination a somewhat finer particle size than would be the case if the clay were calcined in the absence of the added alumina source. Nonetheless, it will often be desired for a particular purpose to repulverize the calcined kaolin clay-alumina pigment of the invention in order to attain a more uniform or finer particle size for the finished pigment. The tendency of alumina to inhibit the tendency of freshly delaminated kaolin to agglomerate upon calcining is noted at column 2 of U.S. Pat. No. 3,403,041, discussed above.

The efficacy of the invention is illustrated by the following examples, including comparative Example 1 which shows prior art pigments for purposes of comparing brightness to pigments exemplifying the invention.

EXAMPLE 1

(Comparative Example)

A calcined, hard kaolin clay pigment sold under the trademark ANSILEX by Engelhard Corporation was used as the hard kaolin clay. This clay has an iron content as $Fe_2O_3$ of about 1% by weight. At least about 90% by weight of the clay consists of particles finer than 3 microns. Aluminum trihydrate sold under the trademark PAPERAD by Reynolds Chemicals was used as the alumina source and comprises 65.3% by weight $Al_2O_3$ and 34.7% $H_2O$. A series of eight pigments was prepared. Samples 2-7 of Table I below were prepared by mixing ANSILEX kaolin clay pigment and PAPERAD aluminum trihydrate ($Al_2O_3.H_2O$) in various proportions to give different weight percents of alumina (calculated as $Al_2O_3$). Sample 1 is a blank sample consisting of 100% kaolin clay pigment with no aluminum trihydrate and Sample 8 is a control sample of 100% aluminum trihydrate with no kaolin clay pigment. Samples 1-7 were prepared as follows: The calcined hard kaolin clay and, except for Sample 1, PAPERAD aluminum trihydrate were slurried in appropriate proportions in water to make up a slurry of 25% total solids and agitated with a motor-driven agitator for 15-20 minutes. The slurry was filtered off immediately on a vacuum funnel, dried 4 hours at 180° F. (82.2° C.), hand crushed and pulverized. The aluminum trihydrate was omitted from Sample 1. Sample 8 consisted of the aluminum trihydrate as received.

The respective powders of Samples 1-8 were pressed into ring-shaped sample holders, and the GE brightness was measured at 457 nanometer wavelength using TAPPI method T64605-75 with results as shown in the following Table I:

TABLE I

| SAMPLE NO. | % $Al_2O_3$ | BRIGHTNESS % | PERCENTAGE POINTS IMPROVEMENT ABOVE BLANK |
|---|---|---|---|
| 1 (Blank) | 0 | 90.7 | 0.0 |
| 2 | 0.5 | 90.8 | 0.1 |
| 3 | 1.0 | 90.7 | 0.0 |
| 4 | 1.3 | 91.0 | 0.3 |
| 5 | 2.0 | 91.0 | 0.3 |
| 6 | 2.6 | 91.0 | 0.3 |
| 7 | 10.0 | 91.7 | 1.0 |
| 8 (Control) | 65.3 | 100.0 | — |

The control Sample 8 (100% aluminum trihydrate) registered the 100% GE brightness expected of pure aluminum trihydrates as compared to 90.7% for the alumina-free hard kaolin clay pigment of blank Sample 1. Therefore, the observed increasing brightness with increasing proportions of the aluminum trihydrate reflects the effect of adding increasing amounts of aluminum trihydrate to the less bright clay. It should be noted that the hard kaolin clay is a pre-calcined product, i.e., it was calcined prior to admixture with the aluminum trihydrate.

EXAMPLE 2

The hard kaolin clay used in this example was from the Engelhard Corporation Dixie mine and was fractionated to remove particles larger than 3 microns. The clay was then beneficiated by ultra-flotation and oxidative and reductive chemical bleaches in accordance with the teachings of U.S. Pat. No. 3,353,668. The beneficiated clay has an iron content, as $Fe_2O_3$, of 1.1% by weight. The alumina source was chemical reagent grade alum, $Al_2(SO_4)_3.18H_2O$.

A series of seven pigments was prepared using two different batches of hard kaolin clay, beneficiated as described above, and mixing the clay and alum in various proportions including zero alum to provide two blank samples, to provide different amounts of alumina (measured as $Al_2O_3$) as shown below. The pigments prepared with the two batches of kaolin clay are respectively denominated Set A and Set B in Table II below.

The required amount of aluminum sulfate was dissolved in water, and the clay was slurried in this solution at 10% clay solids. Slurry pH was adjusted to 2.5 with sulfuric acid. $Al_2O_3$ was then precipitated by adjusting the slurry pH to 7.5 with sodium hydroxide. The product was then filtered on a vacuum funnel, washed, dried, pulverized, calcined at 2000° F. (1093° C.) in a muffle furnace for 40 minutes and pulverized again. The blank Samples 1 and 5 were processed in an identical manner, except that no aluminum sulfate was added.

The powders were pressed into ring-shaped sample holders, and the GE brightness was measured at 457 nanometer wavelength with results as shown in the following Table II:

TABLE II

| | % $Al_2O_3$ | BRIGHTNESS % | PERCENTAGE POINTS IMPROVEMENT ABOVE BLANK |
|---|---|---|---|
| Set A | | | |
| 1 (Blank) | 0 | 92.6 | — |
| 2 | 0.5 | 93.1 | 0.5 |
| 3 | 1.0 | 93.2 | 0.6 |
| 4 | 2.0 | 93.4 | 0.8 |
| Set B | | | |
| 5 (Blank) | 0 | 92.9 | — |
| 6 | 5.0 | 93.8 | 0.9 |
| 7 | 10.0 | 93.9 | 1.0 |

As indicated by TABLE II, increasing amounts of alumina from the alumina source in the calcined pigment provided increased brightness and, as discussed in more detail following Example 3, the brightness enhancement achieved by co-calcining an iron compound-containing kaolin clay, e.g., a hard kaolin clay, and alumina is greater for a given alumina addition than the brightness enhancement achieved by the mere addition of alumina to the pigments of Example I.

EXAMPLE 3

In this example, the clay of Example 2 is utilized as the hard kaolin clay and the aluminum trihydrate of Example 1 is utilized as the alumina source. A series of three pigments was provided by mixing various proportions of the clay and alumina source, including a zero-alumina blank sample. The alumina source was blended with the kaolin as a non-pourable wet paste. The mixture was dried at 180° F. (82.2° C.) for about 24 hours, pulverized, calcined at 2000° F. (1093.3° C.) in a muffle furnace for 40 minutes and pulverized again.

The powders were pressed into ring-shaped sample holders, and the GE brightness was measured at 457 nanometer wavelength with results as shown in TABLE III.

TABLE III

| PIGMENT NO. | % $Al_2O_3$ | BRIGHTNESS % | PERCENTAGE POINTS IMPROVEMENT ABOVE BLANK |
|---|---|---|---|
| 1 (Blank) | 0 | 91.1 | 0.0 |
| 2 | 1.3 | 92.1 | 1.0 |
| 3 | 2.6 | 92.4 | 1.3 |

The data of TABLES I-III are plotted in the sole drawing, in which the curve labelled "co-calcined pigment" is drawn through the data points of the pigments comprising embodiments of the invention and the curve labelled "dried pigments" is drawn through data points of the pigments comprising pre-calcined hard kaolin clay combined, after calcination, with alumina. As used in the drawing the term "co-calcined" alludes to the fact that uncalcined hard kaolin clay was initially calcined after admixture with alumina or an alumina source. As shown by TABLES I–III and the drawing, at a given alumina content, the brightness enhancement over the blank provided by the pigments of the invention is greater than the brightness enhancement attained by merely adding the alumina to precalcined clay and drying the pigment (at 82.2° C.).

It is within the purview of the present invention to provide pigments which comprise a substantial amount of hard kaolin clay plus other pigment constituents, for example, a mechanically delaminated soft kaolin clay, and to calcine at least the hard kaolin clay in the presence of the alumina source in order to obtain enhanced brightness. Thus, as illustrated by the following Example 4, co-calcination of the hard kaolin clay and the alumina source may be carried out in the presence of other pigment constituents admixed with the hard kaolin clay. In those embodiments of the invention wherein the pigments are provided by calcining in the presence of the alumina source hard kaolin clay admixed with soft kaolin clay, the soft clay component should be one which has previously been mechanically delaminated and preferably is obtained by mechanically delaminating a low iron content coarse size fraction of a degritted soft kaolin clay crude. For example, uncalcined hard kaolin clay and delaminated soft white kaolin clay may be admixed with the alumina source and the combined materials calcined to provide the benefits of the present invention. In fact, the use of low iron content delaminated soft clay to prepare the calcined pigments of the invention may result in even higher brightness pigments than those obtained using relatively high iron content hard kaolin clay as the sole clay material charged to the calciner. In this regard, as noted above, soft kaolin clay crudes are generally lower in iron content and coarser in particle size than hard kaolin clay crudes. Fractionation of a soft kaolin clay crude to recover a coarse fraction composed largely of particles larger than about 2 microns generally results in concentration of ferruginous impurities in the fines so that the coarse fraction is even lower in iron content than the crude from which it was obtained. As known in the art, mechanical delamination of such a coarse fraction results in a material which, when calcined, is very white and may be low in abrasiveness.

EXAMPLE 4

The hard kaolin clay used in this Example was from the Engelhard Corporation Dixie mine and a mine degritted clay was fractionated to remove particles larger than 3 microns to provide a fine size fraction having the particle size distribution shown in the following particle size distribution table under the heading "Dixie":

| TABLE OF PARTICLE SIZE DISTRIBUTION | | | |
|---|---|---|---|
| % BY WEIGHT OF SAMPLE | HAVING PARTICLE SIZE DIAMETER FINER THAN (MICRONS) | | |
|  | DIXIE | COARSE CLAY | DELAMINATED |
| 90 | 1.45 | 11.0 | 1.75 |
| 70 | 0.57 | 5.2 | 0.83 |
| 50 | 0.35 | 3.1 | 0.43 |
| 30 | 0.18 | 0.96 | 0.26 |

Separately, an uncalcined coarse size fraction of Georgia soft kaolin clay having the particle size distribution shown in the above Table under the heading "Coarse Clay" was floated, media milled with 8×14 mesh $Al_2O_3$ beads to effect delamination, oxidation and reduction bleached, fractionated to remove particles larger than 3 microns and HIMS (high intensity magnetic separation) treated. At this stage, the resultant delaminated soft kaolin clay fraction had the particle size range shown in the above Table under the heading "Delaminated", and was then wet blended in a 50—50 weight proportion with the hard kaolin clay fine size fraction by slurrying equal weights of the two clays in water and adjusting the pH to 8.5 with sodium carbonate. The slurry was then flocced with 10% $H_2SO_4$, filtered, dried, pulverized and calcined at 2000° F. (1093° C.) for 40 minutes. The resultant pigment had an iron content as $Fe_2O_3$ of 0.68% and a $TiO_2$ content of 0.23%, both on a volatiles-free basis, and showed a wire weight loss of 22 mg in the Valley abrasion test mentioned above.

A second, identically prepared slurry of a 50—50 blend of the hard kaolin clay fine fraction and the delaminated soft kaolin clay fraction was slurried in an identical manner except that a sufficient amount of alum solution, i.e., a solution of $Al_2(SO_4)_3$, to provide 5% $Al_2O_3$ (based on the weight of clay) was added to the clay slurry and $Al_2O_3$ was precipitated onto the clay particles by addition of sodium hydroxide to the acidified slurry. This alumina source/clay mixture was then calcined in the identical manner as the first 50—50 blend of clays. The resultant pigment had an iron content as $Fe_2O_3$ of 0.64% and a $TiO_2$ content of 0.22%, both on a volatiles-free basis, and showed a wire weight loss of 19 mg in the Valley abrasion test as above described.

Powders from the two samples were pressed into ring-shaped sample holders, and the GE brightness was measured at 457 nanometer wavelength with results as shown in the following TABLE IV.

TABLE IV

| SAMPLE NO. | % $AL_2O_3$ | BRIGHT-NESS | PERCENTAGE POINTS IMPROVEMENT ABOVE BLANK |
|---|---|---|---|
| 1 (Blank) | 0 | 94.4 | — |
| 2 | 5 | 95.2 | 0.8 |

An identically prepared blend of the same hard and delaminated soft kaolin clays without any alumina source also showed a 95.2 brightness, but this blend comprised 75 parts by weight of the brighter, soft clay and only 25 parts by weight of the hard clay.

The clay pigment of the invention may be made in any desired particle size range. Typically, for use as a filler or coating for paper or paper products, size range (as determined by conventional sedimentation techniques) may vary. Some typical size ranges are set forth in TABLE V as follows:

TABLE V

| % BY WEIGHT | TYPICAL PIGMENT SIZE RANGES PARTICLE SIZE DIAMETER FINER THAN (MICRONS) | | |
|---|---|---|---|
|  | RANGE: 1 (COARSE) | 2 (MEDIUM) | 3 (FINE) |
| 90% | 8.0 | 3.8 | 3.0 |
| 80% | 5.0 | 2.7 | 1.8 |
| 50% | 1.8 | 1.2 | 0.8 |

Generally, any appropriate particle size range may be utilized for the pigment of the invention.

When utilized as a filler for paper, the abrasiveness of the pigment is of significance since more abrasive, i.e., harder, pigments tend to wear away the wire screens of the papermaking machines at a faster rate. Although the pigments of the invention comprise hard kaolin clay containing up to 15% by weight $Al_2O_3$, they displayed acceptable abrasion values as measured by standard tests. For example, the samples from TABLE II of Example 2 were tested by means of the Valley abrasion test referred to above and results showed the following wire weight loss in milligrams as set forth in the following TABLE VI.

TABLE VI

| EXAMPLE 2 SAMPLE NO. | WIRE WEIGHT LOSS (mg) |
| --- | --- |
| 1 | 16 |
| 2 | 17 |
| 3 | 18 |
| 4 | 23 |
| 6 | 19 |
| 7 | 16 |

The results show that excessive wire weight loss was not encountered even with up to 10% by weight $Al_2O_3$ included in the co-calcined product.

While the invention has been described in detail with respect to specific preferred embodiments thereof, it will be appreciated that upon reading and understanding of the foregoing, modifications may be made thereto which modifications are nonetheless within the spirit and scope of the invention.

What is claimed is:

1. A method of making a white, calcined kaolin clay-based pigment comprises combining an uncalcined, iron compound-containing kaolin clay in fine particulate form with a 0.1 to 15% by weight of alumina and calcining the resultant clay-alumina combination at a temperature of about 870° C. to 1400° C.

2. The method of claim 1 wherein the combination is calcined at a temperature of about 870° C. to 1260° C.

3. The method of claim 1 wherein the resulting pigment comprises about 0.5 to 10% by weight as $Al_2O_3$.

4. The method of claim 1 including combining the kaolin clay and alumina by admixing them in an aqueous vehicle and separating the resultant clay-alumina source combination from the aqueous vehicle.

5. The method of claim 1 wherein the clay-alumina combination is calcined at a temperature and for a time sufficient to fully calcine the clay.

6. The method of claim 1 including calcining the combination for a period of about 0.1 to 3 hours.

7. The method of claim 1 including combining the kaolin clay and an alumina in an aqueous vehicle to form a slurry of clay particles, precipitating the alumina onto the clay particles, separating the thus-coated clay particles from the aqueous phase and calcining the coated particles.

8. The method of claim 1 wherein the kaolin clay is a non-delaminated clay.

9. The method of claim 1 wherein the kaolin clay comprises a hard kaolin clay.

10. A method of making a white, calcined kaolin clay-based pigment comprising combining uncalcined kaolin clay in fine particulate form with alumina and calcining the resultant clay-alumina combination at a temperature of about 870° C. to 1400° C. wherein the hard kaolin clay and the alumina are provided in respective quantities so that the resulting pigment comprises about 0.1 to 15% by weight as $Al_2O_3$ of an inorganic oxide compound of aluminum derived from the alumina.

11. The method of claim 10 wherein the calcining is carried out at a temperature of about 870° C. to 1260° C. for a period of about 0.1 to 3 hours.

12. The method of claim 10 wherein the calcining is carried out at a temperature of about 950° C. to 1050° C. for a period of about 0.1 to 3 hours.

13. A white, calcined kaolin clay-based pigment made by a method comprising the steps of combining an uncalcined, iron compound-containing kaolin clay in fine particulate form with a 0.1 to 15% by weight of alumina and calcining the resultant combination at a temperature of about 870° C. to 1400° C.

14. The pigment of claim 13 made by a method including calcining at a temperature of about 870° C. to 1260° C.

15. The pigment of claim 13 comprising about 0.1 to 15% by weight as $Al_2O_3$.

16. The pigment of claim 13 comprising about 0.5 to 10% by weight as $Al_2O_3$.

17. The pigment of claim 13 made by a method including combining the kaolin clay and alumina by admixing them in an aqueous vehicle, separating the clay and alumina from the aqueous vehicle and drying the resulting combination.

18. The pigment of claim 13 made by a method including calcining the combination for a period of about 0.1 to 3 hours.

19. The pigment of claim 13 made by a method including combining the kaolin clay and alumina in an aqueous vehicle to form a slurry of clay particles, precipitating the alumina from the solution onto the clay particles, separating the thus-coated clay particles from the aqueous phase and calcining the coated particles.

20. The pigment of claim 13 having a particle size range such that at least about 90% by weight of the pigment comprises particles finer than about 10 microns, at least about 80% by weight of the pigment comprises particles finer than about 6 microns and at least about 50% of the pigment comprises particles finer than about 3 microns.

21. The pigment of claim 13 wherein the kaolin clay comprises a hard kaolin clay.

22. The pigment of claim 13 comprising a fully calcined kaolin clay.

23. The pigment of claim 13 comprising a combination of hard and mechanically delaminated soft kaolin clays.

24. The pigment of claim 13 comprising a blend of approximately equal weights of hard and mechanically delaminated soft kaolin clays.

25. The pigment of claim 13 having a brightness of at least about 93.

26. The pigment of claim 13 having a brightness of at least about 95.

* * * * *